(12) United States Patent
Verrier et al.

(10) Patent No.: US 8,338,996 B2
(45) Date of Patent: Dec. 25, 2012

(54) SCAVENGING CONCEPT FOR A HYDROGEN COOLED GENERATOR

(75) Inventors: Michel Verrier, Essert (FR); Flore Bouichou, Lyons (FR)

(73) Assignee: Alstom Technology Ltd, Baden (CH)

( * ) Notice: Subject to any disclaimer, the term of this patent is extended or adjusted under 35 U.S.C. 154(b) by 535 days.

(21) Appl. No.: 12/642,366

(22) Filed: Dec. 18, 2009

(65) Prior Publication Data

US 2010/0187921 A1 Jul. 29, 2010

(30) Foreign Application Priority Data

Dec. 18, 2008 (EP) .................................... 08172060

(51) Int. Cl.
*H02K 9/00* (2006.01)
(52) U.S. Cl. ............................... 310/55; 310/71; 310/91
(58) Field of Classification Search .............. 310/52–59, 310/71, 91
See application file for complete search history.

(56) References Cited

U.S. PATENT DOCUMENTS

| | | | |
|---|---|---|---|
| 2,137,064 A | | 11/1938 | Ross |
| 3,739,207 A | * | 6/1973 | Keilmann et al. ............... 310/59 |
| 3,808,489 A | * | 4/1974 | Albright et al. .................. 310/52 |
| 3,833,826 A | * | 9/1974 | Barton et al. .................... 310/52 |
| 4,121,126 A | * | 10/1978 | Armor et al. ..................... 310/59 |
| 4,140,934 A | * | 2/1979 | Jager et al. ...................... 310/71 |
| 5,374,866 A | * | 12/1994 | Gill et al. ........................ 310/59 |

FOREIGN PATENT DOCUMENTS

JP 58212342 A 12/1983

OTHER PUBLICATIONS

European Search Report dated Nov. 10, 2009, which issued during the prosecution of related European Patent Application No. EP 08172060; 5 pages.

\* cited by examiner

*Primary Examiner* — Thanh Lam
(74) *Attorney, Agent, or Firm* — Leydig, Voit & Mayer, Ltd.

(57) ABSTRACT

A hydrogen cooled generator assembly includes a hydrogen cooled generator and a fundament, wherein the generator is mounted on the fundament, and wherein the fundament includes at least one cavity underneath the generator. The at least one cavity includes at least one terminal box disposed adjacent to the generator and extending downward from the generator for collection of a plurality of electrical links from the generator; at least one collection box disposed beneath the at least one terminal box having a top wall and a first and a second side wall and configured to guide the plurality of electrical links from the at least one terminal box in a further downward direction; a lateral space; and a seal plate covering the lateral space at an upper end of the lateral space.

20 Claims, 5 Drawing Sheets

SCAVENGING CONCEPT FOR A HYDROGEN COOLED GENERATOR

Priority is claimed to European Application No. EP 08172060.9, filed on Dec. 18, 2008, the entire disclosure of which is incorporated by reference herein.

The present invention relates to the field of hydrogen cooled generators. It in particular relates to a hydrogen cooled generator assembly in which a hydrogen cooled generator is mounted on a fundament, said fundament including at least one cavity underneath the generator, wherein in this cavity there is located, adjacent to the generator and downwardly extending therefrom, at least one terminal box for the collection of the electrical links from the generator, and wherein in this cavity there is located, essentially beneath said terminal box at least one collection box, through which electrical links from the terminal box are guided in a further downwards direction, said electrical links entering the collection box through a top wall thereof.

BACKGROUND

The environment around an alternator/generator is exposed to a constant risk of explosion if gaseous hydrogen, which is an extremely flammable substance, is used for cooling. There are many possible sources of hydrogen leakage around an alternator, allowing hydrogen to leak out into the atmosphere, such as leaky spots at the wave guide seals, interfaces and air-tight transitions, as well as drill holes made by man or instrumentation plug-ins, etc. The circumference of the alternator, being a hazardous area, is classified in zone 2 according to the definition of the norm EN 60079-10.

The design of new alternators therefore must be improved as to protection against the risk of explosion.

SUMMARY OF THE INVENTION

An aspect of the present invention is therefore to provide a hydrogen cooled generator assembly with a reduced risk of explosion due to leakage of hydrogen. In particular an improvement shall be provided for hydrogen cooled generator assemblies in which the hydrogen cooled generator is mounted on a fundament, said fundament including at least one cavity underneath the generator, wherein in this cavity there is further preferably located, adjacent to the generator and downwardly extending therefrom, at least one terminal box for the collection of the electrical links from the generator, and wherein in this cavity there is located, essentially beneath said terminal box at least one collection box, through which electrical links from the terminal box are guided in a further downwards direction, said electrical links entering the collection box through a top wall thereof.

In particular for the common situation where the side walls of the collection box (typically there are two boxes, one of them at each end of the generator) and walls of the cavity in the fundament (typically vertical walls) are distanced from each other and defining a lateral space, the expression lateral space shall include also axial parts of such space with respect to the generator axis. The invention significantly reduces the risk of harmful hydrogen accumulation in the bottom part of the generator in that the lateral space is covered by a seal plate towards its upper side.

Indeed it was found that one of the critical areas, in spite of the fact that hydrogen has a lower specific mass than air, is the bottom part in the fundament of a hydrogen cooled generator. This is where the power converted to electrical energy in the generator is guided away by means of electrical links, typically a set of six at each axial end of the generator. The region where these links are connected to the stator part of the generator are hydrogen cooled and so are the initial sections of the electrical links leading away from the stator. Correspondingly, as the electrical links are commonly guided away from the generator in an essentially vertical downwards direction into the fundament, this is a highly critical region where leakage can take place and where spark generation cannot be excluded. In particular in the assemblies of the general structure as outlined above, where there is cavities in the fundament in which there is located boxes, in this document called collection boxes, through which the electrical links are guided. These collection boxes stainless steel boxes are with side walls which are distanced from the walls of the typically concrete-based fundament.

According to the state-of-the-art cooling air is forced into the collection boxes and is allowed to leave the collection boxes through a top wall thereof. The airflow and the convection leads to a situation in which a large portion of the cooling air travelling through the collection boxes enters the lateral space and, due to vortices and the like even may promote accumulation of hydrogen in these areas. Only a small fraction of the airflow left the space around the generator is travelling upwards and past the generator. The major fraction of the airflow is either captured in the lateral spaces around the collection boxes or leaves these lateral spaces through uncontrolled gaps and channels in a further lateral and/or downward direction increasing the risk of explosion in these areas as well.

However, the lateral space is important and must be accessible for maintenance, installation and the like.

It was now surprisingly found that these problems can be solved by providing a seal plate essentially preventing the cooling air exiting the collection boxes to enter these lateral spaces.

According to a first preferred embodiment, the seal plate at least with its edge(s) bordering the collection box is at essentially the same height as or not more than 50 cm or preferably not more than 20 cm, or preferably not more than 10 cm, below the vertical position of the top wall of the collection box.

According to a further preferred embodiment, the seal plate is essentially horizontal. The seal plate may however also be tilted or even specifically shaped, as long as it fulfils the above function to essentially shield the lateral space from cooling air entering it. For improving the airflow conditions it is for example possible to have seal plates which with their edges are bordering the collection box essentially at the same level as the top wall of the collection box, and then either straight or in a smooth round shape are going up towards a higher part of the surrounding wall of the fundament. Using such a shape reduces the risk of having non-circulated or vortex-prone zones, it however on the other hand may reduce simplicity and possibilities of access, installation and the like.

According to a further preferred embodiment, the seal plate is made of an electrically insulating material or at least coated with an electrically insulating material. Preferably the seal plate is made of or coated with an polymer material, preferably selected from epoxy-based polymer materials. The polymer material can be fibre-reinforced, e.g. glass fibre-reinforced.

It is possible and in many cases desirable that the seal plate is not completely sealing the lateral space from the space above and allows some of the cooling air exiting the collection box to enter the lateral space. Typically in the range of 5-15% of the air stream above is allowed to enter the lateral space. This targeted "permeability" of the seal plate can be provided by allowing openings and/or gaps in particular for feeding through electrical and/or cooling media connections.

There can further be provided holes (manholes) in the seal plate for entering the lateral space from above or for leaving the lateral space from below.

A further preferred embodiment of the present invention is characterised in that said side walls of the collection box are distanced from the walls of the cavity in the fundament in an axial as well as a lateral direction with respect to the main axis of the generator. This typically in a lateral and/or axial direction by at least 50 cm, preferably by at least 1 m. Normally and preferably the seal plate essentially covers the whole peripheral lateral space surrounding the collection box in lateral and axial direction.

According to a further preferred embodiment, the electrical links are individually guided in columnar structures from the terminal box in a downward direction into and through said collection box. Further preferably at least three such electrical links, more preferably at least or exactly six such electrical link, are provided for each terminal box. Preferably the top wall for each electrical links is provided with a preferably cylindrical (also square, rectangular or triangular or generally polygonal cross-sections are however possible) tubular structure extending from the top wall towards the terminal box. Normally, each tubular structure has an inner diameter larger than the outer diameter of the corresponding electrical link, and each tubular structure is open towards the interior of the collection box and open towards the top, the former opening allowing cooling air to enter the tubular structure and the latter allowing the cooling air to exit it. Preferably the top edge of the tubular structure is distanced from a bottom wall of the terminal box such that the cooling air stream is not hindered, so typically by at least 10 cm, more preferably by at least 20 cm, and even more preferably by at least 40 cm.

Preferably, the axis of each tubular structure is essentially collinear with the axis of the corresponding electrical link.

The outer diameter of each electrical link can be at least a factor 2, preferably at least a factor 3, more preferably at least a factor 4 smaller than the inner diameter of the corresponding tubular structure. Put differently, the outer diameter of each electrical link can be in the range of 5-20 mm, preferably in the range of 5-15 mm, and the inner diameter of each tubular structure can be in the range of 20-100 mm, preferably in the range of 30-60 mm.

In at least one of the tubular structures there can furthermore be provided at least one ring winding for measuring the current in the electrical link going through the tubular structure. Preferably the ring winding is arranged and shaped such that it is cooled by the air stream travelling through the tubular structure from the collection box.

As mentioned above, preferably at each axial end of the generator there are located a terminal box and a collection box.

According to one further preferred embodiment, at least one fan or ventilator (or an equivalent means for propelling cooling air) is located further below in the fundament and/or (laterally) outside of the fundament for the aspiration of outside air. The cooling air propelled by said ventilator/fan is channelled through cooling air piping or channels to the bottom part of the at least one collection box.

The invention furthermore relates to a method for scavenging the bottom part of a hydrogen cooled generator. This typically in the situation where the generator is mounted on a fundament, said fundament including at least one cavity underneath the generator, wherein in this cavity there is located, adjacent to the generator and downwardly extending therefrom, at least one terminal box for the collection of the electrical links from the generator, wherein in this cavity there is located, essentially beneath said terminal box at least one collection box, through which electrical links from the terminal box are guided in a further downwards direction, said electrical links entering the collection box through a top wall thereof, wherein side walls of the collection box and walls of the cavity in the fundament are distanced from each other and defining a lateral space, and wherein the lateral space is covered by a seal plate towards its upper side, including the steps of forcing externally provided cooling air into said at least one collection box and allowing the cooling air to leave the collection box through its top wall and subsequently allowing the cooling air to travel through the space surrounding the generator and leaving this space towards the top.

The method can preferably be carried out on a generator described above. It can further preferably be carried out with an air flow in the range of 10,000-30,000 $m^3$/h/terminal (in case of two collection boxes at each terminal end of the generator in total the double of this amount) measured at standard temperature and pressure.

Further embodiments of the present invention are outlined in the dependent claims.

BRIEF DESCRIPTION OF THE DRAWINGS

In the accompanying drawings preferred embodiments of the invention are shown in which.

DETAILED DESCRIPTION

Figure 1:
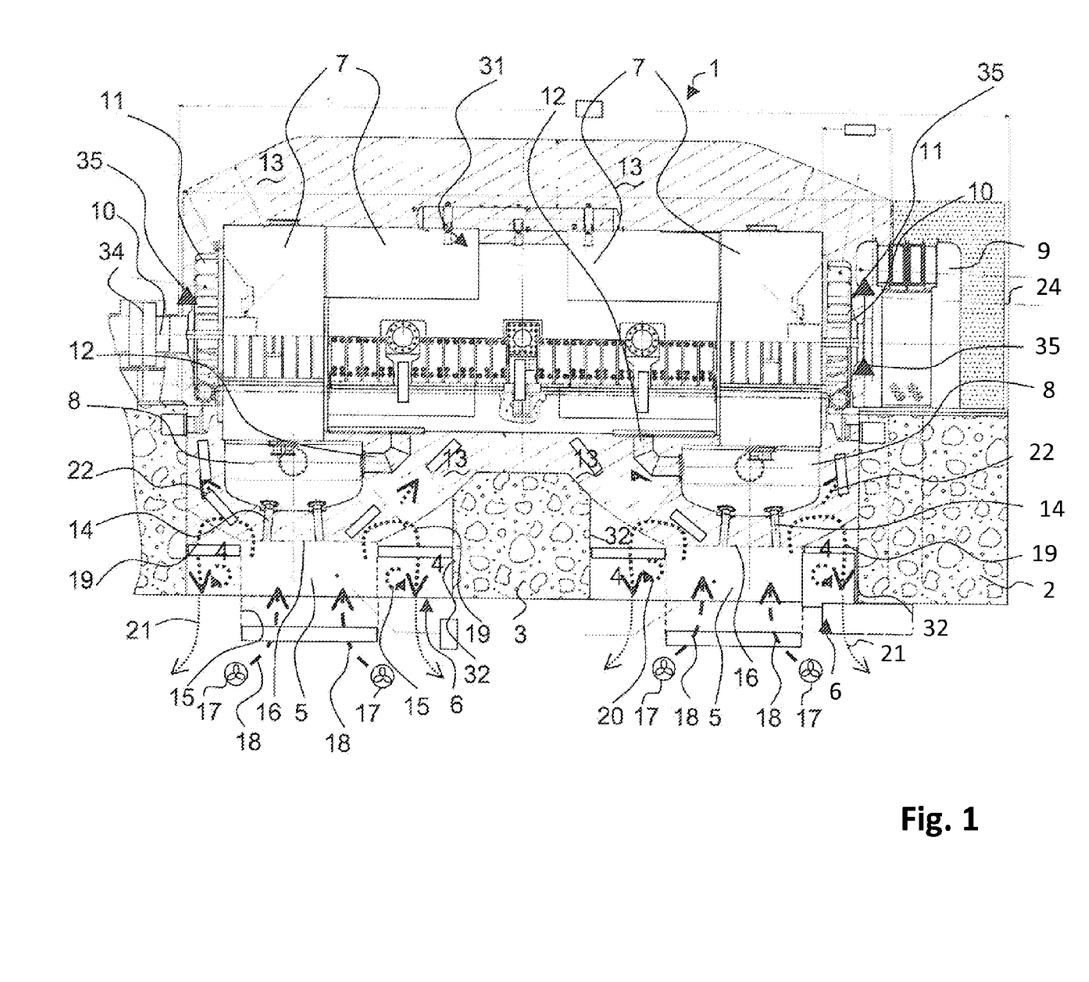
FIG. 1 is an axial cut through a hydrogen cooled generator with the bottom part airflow conditions according to the state-of-the-art.
Figure 2:
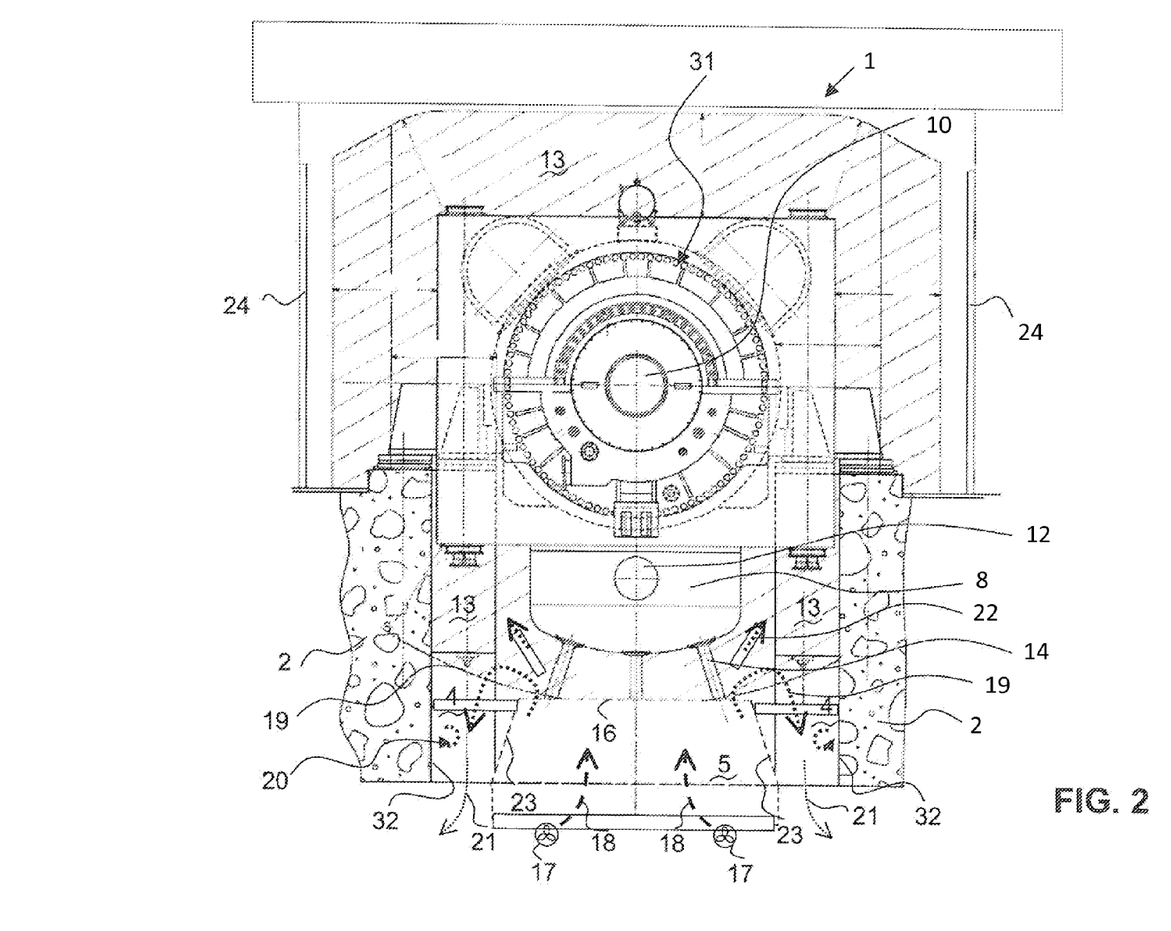
FIG. 2 is a cut perpendicular to the main axis of a hydrogen cooled generator according to FIG. 1 with the bottom part airflow conditions according to the state-of-the-art.

Referring to the drawings, which are for the purpose of illustrating the present preferred embodiments of the invention and not for the purpose of limiting the same, FIG. 1 and FIG. 2 show a hydrogen cooled generator assembly 1 in an axial cut (FIG. 1) and in a cut perpendicular to the axis of the generator in the region of the terminal box 8 (FIG. 2). In FIGS. 1 and 2 the cooling airflow in the bottom part is illustrated for the situation according to the state of the art.

The axial generator 31 is mounted on top of a fundament 2, which is usually made of concrete. The fundament is provided with two cavities 6 at each terminal end of the generator. Between these two cavities 6 there is a central part 3 of the fundament. The generator 31 is a hydrogen cooled generator, so it is equipped with the necessary elements 7 for hydrogen cooling. The generator usually comprises a stator as well as a rotor, the latter being mounted on a shaft 10 which is supported by bearings, the stiffening ribs 11 are visible at the terminal ends. At one terminal end of the generator and above the fundament there is located an exciter 9, which can be of contacting or contact free architecture, and at the opposite terminal end there is located a shaft grounding system 34. Preferably the upper structure of the generator, i.e. those parts which are above the fundament, are surrounded by an upper side wall 24 circumferentially surrounding the generator parts. This preferably with the exception of the shaft grounding system 34 as this system has the tendency to show sparking and correspondingly could increase the risk of explosion in case of hydrogen leakage.

Around the generator there is a hazardous area 13, which in all the figures is illustrated by an obliquely dashed shading. This hazardous area 13 in many countries is defined the area of a distance of 1.5 meters surrounding all the potentially gas-leaking parts of the generator and its connections.

Towards the bottom at each terminal of the generator there is located a terminal box 8 in which the electricity generated in its stator is collected and grouped into individual conductors. This part is typically hydrogen cooled and a corresponding cooling pipe 12 is indicated as well.

This terminal box 8 at each end of the generator is located adjacent to the generator and penetrates into the above-mentioned cavity 6. Six individual electrical links, arranged in two axially spaced rows of three individual links leave the terminal box 8 of each end in a downwards direction and penetrate into the cavity 6. Below each terminal box 8 there is provided a so called collection box 5, which is a stainless steel box with sidewalls 15 (axial) and 23 (lateral). The electrical links 14 penetrate into each of these collection boxes 5 and are (not illustrated) guided out of the fundament further below.

For installation and maintenance it is important that the sidewalls 15, 23 of these collection boxes 5 are spaced from the vertical walls 32 surrounding and defining the cavity 6 in the fundaments. Correspondingly between the collection box 5 and the vertical walls 32 there is a so called lateral space 4 (in axial and lateral direction).

Due to the high power transported by means of the electrical links 14, these electrical links 14 must be cooled. This is effected by means of a cooling airflow which works as follows. External cooling air is aspired by ventilators 17 (only schematically indicated in FIGS. 1-4, these ventilators are located either outside of the fundament or much further below). These ventilators aspire cold outside air and push it trough corresponding channels into the collection boxes 5. While on their lateral and axial sides these collection boxes 5 are essentially airtight, the top walls 16 thereof, through which the electrical links 14 penetrate, are provided with cooling air exit holes. Correspondingly the cooling air 18 entering the collection boxes 5 leaves these boxes 5 on their top as illustrated by the cooling air arrows 19.

Due to the flow conditions in this bottom part, the cooling airflow is mainly redirected in a downward direction and into the corresponding lateral space 4. In this lateral space vortices 20 are formed and a part 21 exits these lateral spaces 4 trough uncontrolled gaps and channels in a downwards and lateral/axial direction.

This leads to an undesirably high residence time of cooling air, and potentially therefore also of hydrogen, in the lateral spaces 4. Indeed only a small fraction indicated with arrow 22 travels in upwards direction and passes the generator.

Figure 3:
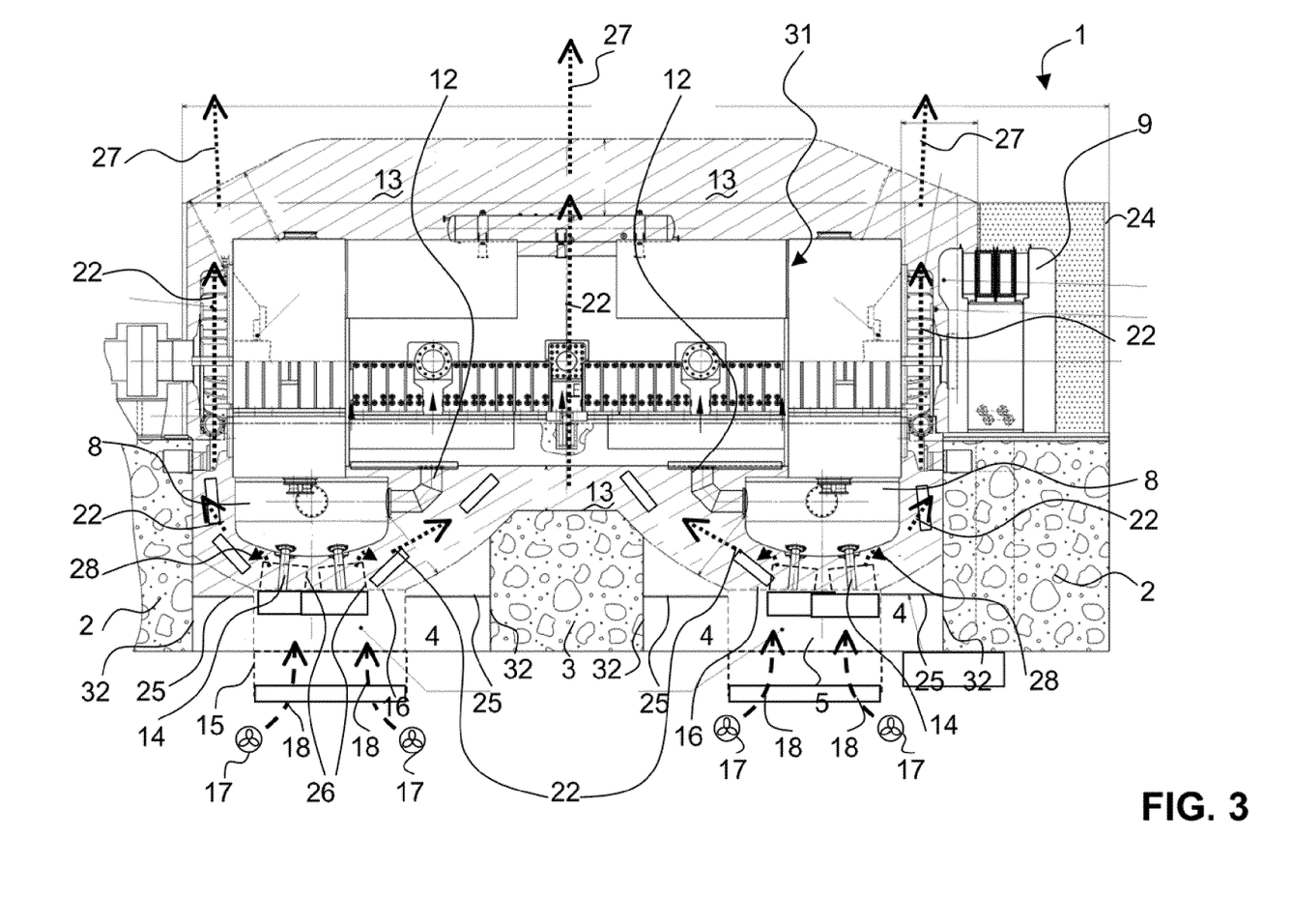
FIG. 3 is an axial cut through a hydrogen cooled generator with airflow conditions according to the invention.
Figure 4A:
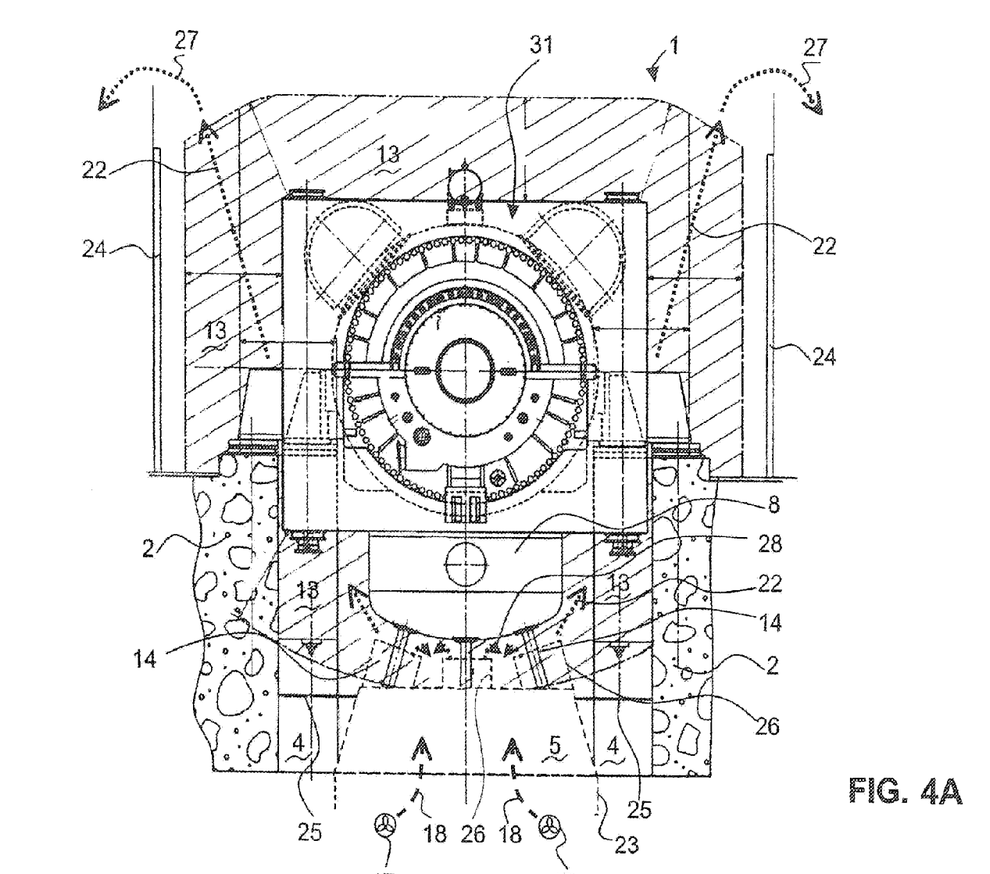
FIGS. 4A and B include a cut perpendicular to the main axis of a hydrogen cooled generator according to FIG. 3 with the airflow conditions according to the invention.
Figure 4B:
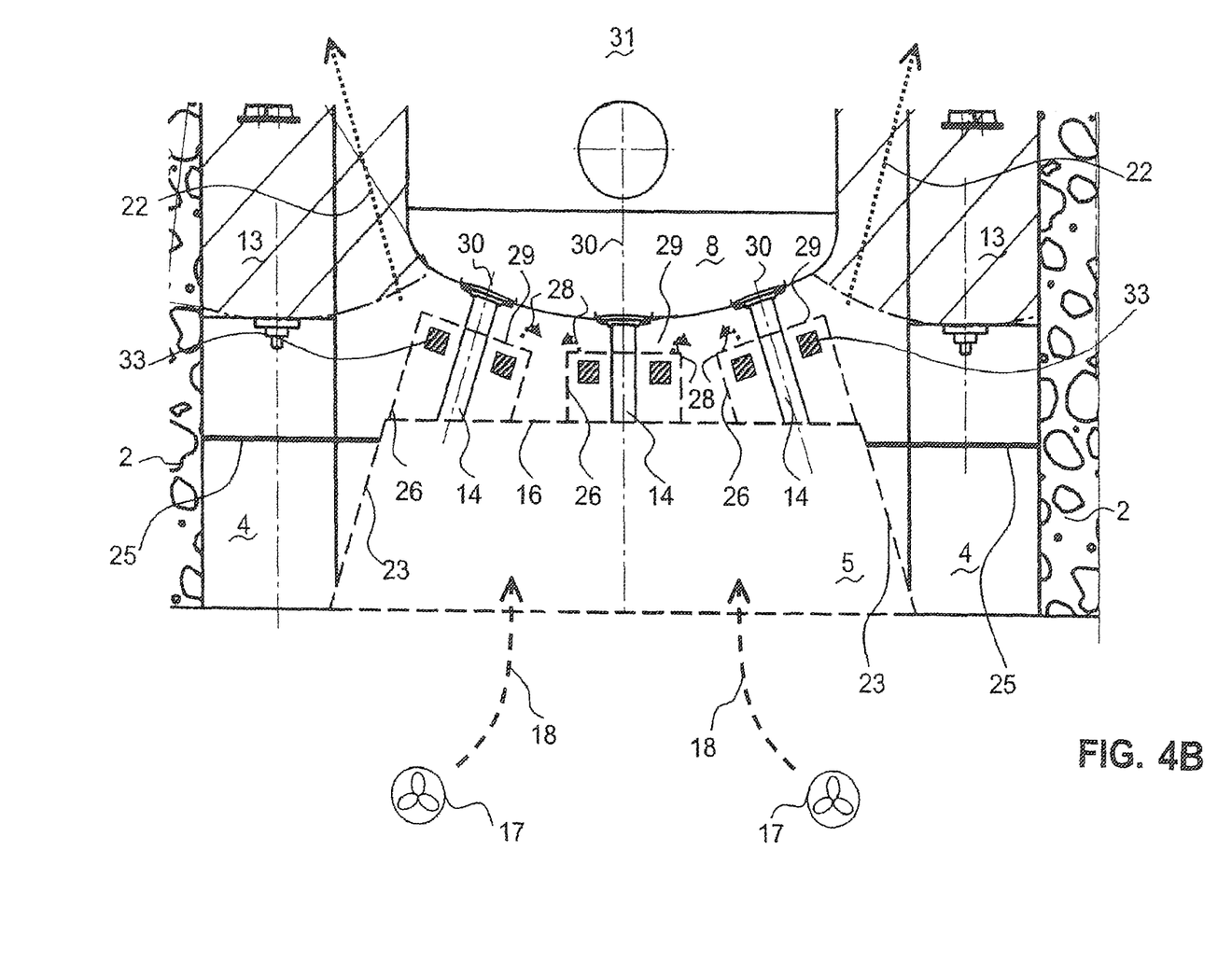

This is where the invention proposes a solution. As illustrated in FIGS. 3 and 4A and B, again showing an axial cut (FIG. 3) and an corresponding cut in a plane perpendicular to the axis of the generator (FIGS. 4A and B), there are provided seal plates 25 which essentially cover the lateral spaces 4 on their top opening.

These seal plates, which can either be removed or which are provided with manholes for access the lateral spaces 4 for maintenance and/or installation, essentially prevent that cooling air enters into these lateral spaces. Accumulation of hydrogen in these lateral spaces 4 can therefore efficiently be prevented.

Indeed due to the presence of the seal plates 25 cooling air exiting via the top wall of the collection boxes 5 can essentially only travel trough the hazardous area 13 in upwards direction, past the axial generator parts and leave the hazardous area 13 as indicated by arrows 27 in an upwards movement.

Further specific control of the airflow is provided in that the top wall 16 of each of the collection boxes 5 is provided with tubes 26. Each of these tubes, in some more detail illustrated in FIG. 4, which is a cut in a direction perpendicular to the axis of the generator, are coaxial to each of the electrical links and surround these electrical links 14. Cooling air from inside of the collection box 5 is essentially only allowed to travel trough these tubular structures 26, which are open on their bottom side towards the interior of the collection box 5 and which are also open towards their upper end. Correspondingly cooling air is only allowed to exit the collection boxes 5 via these tubes 26 leading to a situation where the cooling air travels in a controlled manner along the electrical links. The cooling is thereby focused to the area where it is most needed.

Furthermore, as indicated in FIG. 4B, in these tubular structures there are located ring windings 23 for the measurement of the current in the electrical links 14. Locating theses ring windings in these tubular structures 26 has the advantage that the current can be highly efficiently measured, and furthermore these ring windings, which need to be cooled, are located in a region where there is a high cooling airflow.

It should be noted that the seal plates 25 do not have to be completely airtight, quite by contrast, it is desirable to have a small airflow (typically 10%) also through these seal plates in order to allow a certain scavenging of the area 4. This airflow can be provided by specifically leaving clearances at the edges of the seal plate 25 and by leaving certain openings which can also be used for cables, cooling piping and a like. Furthermore the seal plates 25 can be provided by manholes which however usually are provided with means for closing them.

Typically the seal plates 25 are made of an insulating material, for example a polymer material which can be glass fibre reinforced. In any case the seal plate is preferably mounted such that it can be removed easily for installation and maintenance. It is also possible that the seal plate is made of aluminium.

As one can see, the seal plates in combination with the structuring of the collection boxes allow a controlled scavenging of the hazardous area surrounding the generator from the bottom to the top.

LIST OF REFERENCE NUMERALS 1 hydrogen cooled generator assembly
2 fundament
3 fundament, central part
4 lateral space
5 collection box
6 cavity in fundament
7 hydrogen coolers of 1
8 terminal box
9 exciter
10 shaft
11 stiffening ribs of flange bearing
12 cooling pipe
13 hazardous area
14 electrical links
15 axial side wall of 5
16 top wall of 5
17 ventilator
18 cooling air supply to 8
19 cooling air exiting 8

20 vortexes
21 air exiting lateral space in a downwards or lateral direction
22 air travelling in hazardous area towards the top
23 lateral side wall of 5
24 upper side wall
25 seal plate
26 tubes of 16
27 air exiting 1
28 air exiting 26
29 top opening of 26
30 axis of 14 and 26
31 generator
32 vertical walls of 6
33 ring winding
34 shaft grounding system
35 hydrogen detector

What is claimed is:

1. A hydrogen cooled generator assembly comprising:
a hydrogen cooled generator;
a fundament, wherein the generator is mounted on the fundament, and wherein the fundament includes at least one cavity underneath the generator, the at least one cavity being defined by a plurality of cavity walls;
at least one terminal box disposed in the cavity and adjacent to the generator and extending downward from the generator for collection of a plurality of electrical links from the generator;
at least one collection box disposed in the cavity and essentially beneath the at least one terminal box having a top terminal box wall and first and second side terminal box walls and configured to guide the plurality of electrical links from the at least one terminal box in a further downward direction, wherein the plurality of electrical links enters the at least one collection box through the top terminal box wall, and wherein cooling air is configured to flow into the at least one collection box and configured to leave through the top terminal box wall;
a lateral space defined by the first side terminal box wall, the second side terminal box wall, the plurality of cavity walls; and
a seal plate delimiting the lateral space at an upper end of the lateral space.

2. The hydrogen cooled generator assembly as recited in claim 1, wherein an edge of the seal plate borders the at least one collection box and the seal plate is disposed at the same height as or not more than 50 cm below the top wall.

3. The hydrogen cooled generator assembly as recited in claim 1, wherein the seal plate is disposed horizontally.

4. The hydrogen cooled generator assembly as recited in claim 1, wherein the seal plate one of includes an electrically insulating.

5. The hydrogen cooled generator assembly as recited in claim 4, wherein the electrically insulating material is a glass fibre reinforced polymer material selected from epoxy-based polymer materials.

6. The hydrogen cooled generator assembly as recited in claim 1, wherein the seal plate does not completely seal the lateral space from a space above the seal plate so as to allow 5-15% of the cooling air to enter the lateral space.

7. The hydrogen cooled generator assembly as recited in claim 6, wherein the seal plate includes openings configured to enable entry to the lateral space from above.

8. The hydrogen cooled generator assembly as recited in claim 1, wherein the first terminal box side wall, the second terminal box side wall, are distanced from the plurality of cavity walls in an axial and in a lateral direction relative to a main axis of the generator by at least 50 cm, and wherein the seal plate covers a whole periphery of the lateral space surrounding the at least one collection box in the lateral direction.

9. The hydrogen cooled generator assembly as recited in claim 1, wherein each one of the plurality of electrical links are guided in each one of a plurality of columnar structures from the at least one terminal box in a downward direction and through the at least one collection box, wherein the top wall includes a plurality of tubular structures extending from the top wall towards the at least one terminal box, each one of the plurality of tubular structures corresponding to each one of the plurality of electrical links and having an inner diameter larger than an outer diameter of a corresponding electrical link, and wherein each one of the plurality of tubular structures is open towards an interior of the at least one collection box and open towards a top edge of the tubular structure.

10. The hydrogen cooled generator assembly as recited in claim 9, wherein the plurality of electrical links includes at least three electrical links.

11. The hydrogen cooled generator assembly as recited in claim 10, wherein the top edge of the tubular structure is distanced from a bottom wall of the terminal box by at least 10 cm.

12. The hydrogen cooled generator assembly as recited in claim 9, wherein an axis of each one of the plurality of tubular structures is collinear with an axis of the corresponding electrical link.

13. The hydrogen cooled generator assembly as recited in claim 9, wherein the inner diameter of each of the plurality of tubular structures is at least a factor 2 larger than an outer diameter of the corresponding electrical link.

14. The hydrogen cooled generator assembly as recited in claim 9, wherein the outer diameter of each one of the plurality of electrical links is in a range of 5 mm-20 mm, and wherein the inner diameter of each one of the plurality of tubular structures is in a range of 20 mm-100 mm.

15. The hydrogen cooled generator assembly as recited in claim 14, wherein the outer diameter of each one of the plurality of electrical links is in a range of 5 mm-15 mm, and wherein the inner diameter of each one of the plurality of tubular structures is in a range of 30 mm-60 mm.

16. The hydrogen cooled generator assembly as recited in claim 9, wherein at least one of the plurality of tubular structures includes at least one ring winding configured to measure the current in a corresponding electrical link.

17. The hydrogen cooled generator assembly as recited in claim 16, wherein the cooling air is configured to travel through each one of the plurality of tubular structures from the at least collection box so as to cool the at least one ring winding.

18. The hydrogen cooled generator assembly as recited in claim 1, wherein the at least one terminal box and the at least one collection box are disposed at each axial end of the generator, and wherein at least one ventilator is disposed in the fundament or outside of the fundament for the aspiration of outside air, and wherein cooling air propelled by the at least one ventilator is configured to be channelled through cooling air piping to a bottom part of the at least one collection box.

19. A method for scavenging the bottom part of a hydrogen cooled generator, wherein the hydrogen cooled generator is mounted on a fundament, and wherein the fundament includes at least one cavity underneath the generator, the at least one cavity including a first and a second vertical wall; at least one terminal box disposed adjacent to the generator and extending downward from the generator for collection of a plurality of electrical links from the generator; at least one collection box disposed beneath the at least one terminal box having a top wall and a first and a second side wall and configured to guide the plurality of electrical links from the at least one terminal box in a further downward direction, wherein the plurality of electrical links enters the at least one collection box through the top wall, and wherein cooling air is configured to flow into the at least one collection box and configured to leave through the top wall; a lateral space defined by the first side wall, the second side wall, the first vertical wall and the second vertical wall; and a seal plate covering the lateral space at an upper end of the lateral space, the method comprising:

forcing externally provided cooling air into the at least one collection box;

allowing the cooling air to leave the at least one collection box through the top wall; and allowing the cooling air to travel through a space surrounding the generator and to leave the space towards a top part of the space.

20. The method as recited in claim 19, wherein the air flow is in a range of 10,000-30,000 $m^3$/h/terminal measured at standard temperature and pressure.

\* \* \* \* \*